US009165316B2

(12) United States Patent
Tiano

(10) Patent No.: US 9,165,316 B2
(45) Date of Patent: Oct. 20, 2015

(54) SYSTEM AND PROCESS FOR MONITORING, CONTROL AND WITHDRAWAL OF CONSUMABLE ITEMS IN A PRODUCTION ENVIRONMENT

(76) Inventor: Matitiahu Tiano, Tel Aviv (IL)

( * ) Notice: Subject to any disclaimer, the term of this patent is extended or adjusted under 35 U.S.C. 154(b) by 0 days.

(21) Appl. No.: 12/999,310

(22) PCT Filed: Sep. 12, 2008

(86) PCT No.: PCT/IL2008/001596
§ 371 (c)(1),
(2), (4) Date: Dec. 16, 2010

(87) PCT Pub. No.: WO2010/001380
PCT Pub. Date: Jan. 7, 2010

(65) Prior Publication Data
US 2011/0093365 A1 Apr. 21, 2011

(30) Foreign Application Priority Data

Jun. 30, 2008 (IL) .......................................... 192519

(51) Int. Cl.
| G06Q 30/06 | (2012.01) |
| G06Q 10/06 | (2012.01) |
| G06Q 10/08 | (2012.01) |
| G06Q 30/02 | (2012.01) |
| G05B 19/4065 | (2006.01) |
| G05B 19/418 | (2006.01) |
| G07C 3/00 | (2006.01) |
| G07C 3/08 | (2006.01) |

(52) U.S. Cl.
CPC ............ *G06Q 30/06* (2013.01); *G05B 19/4065* (2013.01); *G05B 19/41875* (2013.01); *G06Q 10/06* (2013.01); *G06Q 10/08* (2013.01); *G06Q 10/083* (2013.01); *G06Q 10/087* (2013.01); *G06Q 30/0201* (2013.01); *G07C 3/005* (2013.01); *G07C 3/08* (2013.01); *G05B 2219/32179* (2013.01); *G05B 2219/32182* (2013.01)

(58) Field of Classification Search
CPC ... G06Q 10/087; G06Q 10/06; G06Q 10/083; G06Q 30/0201; G06Q 30/06
USPC .......................................................... 705/28
See application file for complete search history.

(56) References Cited

U.S. PATENT DOCUMENTS

| 5,205,436 | A | * | 4/1993 | Savage | .............................. | 221/7 |
| 2004/0148136 | A1 | * | 7/2004 | Sasaki et al. | ................... | 702/188 |
| 2006/0120735 | A1 | * | 6/2006 | Adkins et al. | .................... | 399/12 |
| 2008/0059340 | A1 | * | 3/2008 | McCaherty et al. | ............ | 705/28 |
| 2009/0222359 | A1 | * | 9/2009 | Henry | ............................. | 705/28 |

FOREIGN PATENT DOCUMENTS

| JP | 3-150602 A | 6/1991 |
| JP | 6-39348 U | 5/1994 |
| JP | 11-48100 A | 2/1999 |

OTHER PUBLICATIONS

McIntyre, Stephen L. "The repair man will gyp you": Mechanics, managers, and customers in the automobile repair industry, 1896-1940. University of Missouri—Columbia, ProQuest, UMI Dissertations Publishing, 1995.*

* cited by examiner

*Primary Examiner* — Ryan Zeender
*Assistant Examiner* — Fawaad Haider
(74) *Attorney, Agent, or Firm* — The Webb Law Firm

(57) ABSTRACT

The invention refers to a system and a process for the measure and collection of consumables consumption and performance data to build a reliable, real-time database and to monitor the consumption and performance of a consumable tool through its life cycle. A system according to the invention comprises a) first storage means to store data concerning the consumables; b) means to capture the performance data; c) second storage means to store performance data during operation of the consumable when is mounted on a machine; d) means to transfer in real-time the performance data to the said second storage means; e) process means to assess the performance of the tool and on the basis of the said assessment to instruct or not the withdrawal of the tool; and output means to deliver the said instruction to a user of the system. A process according to the invention, comprises the following steps: a) capture performance data during operation of the tool when the tool is mounted on a machine; b) transfer in real¬ time the performance data to the management system; c) assess the performance of the tool; d) on the basis of said assessment instruct or not the withdrawal of the tool; and e) deliver the instruction to withdraw the tool to the user via output means.

21 Claims, No Drawings

SYSTEM AND PROCESS FOR MONITORING, CONTROL AND WITHDRAWAL OF CONSUMABLE ITEMS IN A PRODUCTION ENVIRONMENT

The invention refers to a system and a process for the measure and collection of consumables consumption and performance data to build a reliable, real-time database, to monitor the consumption and performance of a consumable tool throughout its life cycle. The system and the process, according to the invention, incorporates a data administration system, which offers the user of the invention, the possibility to get reliable, real-time a) financial data such as consumable costs per produced part, effective and non-effective machining time costs per produced part, b) logistics data such as accurate stock levels and stock locations, c) operational data such as consumption behaviour, d) engineering data such as tool relation to operation/machine performance level, e) quality assurance data such as process repeatability, and to use the data for a variety of reasons such as calculation of the production cost per part, engineering focus for technological improvements, accurate stock level planning, discipline enforcement and scrap reduction in a reliable, real-time process. To achieve this effect, the invention combines hardware and software for the digital administration of the consumable tool location and performance, i.e. from the entrance of the new tool into the stock, its performance on the machine, follow the used tool for re-work and re-use, in case it requires, and until the tool comes to its life end, handling it as valued scrap. The consumable tool may be any tool or material which is consumed by the production process ongoing, i.e. milling cutters, turning inserts, drills, saws, grinding wheels, etc.

There are eight to nine stages in the life cycle of the consumable tool: a) ordering, the tool, b) producing the tool, c) supply the tool to the customer storage d) withdraw the tool from the storage by the production, e) held in stand by before mounted on the machine, f) working on the machine until it comes to its life end or it does not perform or the job was changed, g) in some cases, when the tool comes to its life end, it goes for re-work and come back for re-use, this cycle maybe effective several times in the life cycle of one individual tool, h) store the tool as scrap, i) sell the scrapped tools for recycle.

Ordering the tools involves the purchase department, the pre-planning department, the storage and the supplier. The purchase department is executing the ordering procedure using historical consumption figures to calculate, how many tools are needed to meet the production program while considering the existing stock and the normal delivery time of the supplier. The production program is designed by the pre-planning department, the existing stock is handled and reported by the storage and the delivery time is quoted by the supplier. The lack of reliable, real-time tool life data enforce using historical consumption data to calculate a rough average tool life, the lack of registration of stock which was withdrawn from the storage by the production and is in stand by position and the lack of correlation between the storage stock to the confirmed delivery date of tools which are in production or in rework, make the storage stock report inaccurate. Further the lack of on-line communication with the supplier causes a mismatch between the considered delivery date to the average or actual supplier's confirmed delivery date. All the above, cause eventually inaccurate ordering quantity, and subsequently in over stock or lack of stock which both have a big financial impact.

Producing the tool and follow-up the tool production involves the supplier, the purchase department and the storage. Once the order is ready it is sent by the purchase department through e-mail or fax to the supplier. The supplier puts the order into production and confirms the date the tools will be delivered. The tools which entered production at the supplier and their delivery date is already known, does not show in the customers[1] storage stock reports. In cases of change in the confirmed delivery date the customer relay on the supplier to report and there is no on-line procedure which makes sure that the system is updated.

Delivering the tools involve the supplier, a forwarder, the purchase department and the storage. In many cases, once the order is ready the purchase department relies on the supplier to notify and supply it to the storage, as there is no automatic procedure which alerts the purchase and the storage that an order is ready, making sure it is delivered on time. This results in situations where the production requires the tools but they are not available in the storage as they were already produced by the supplier but not delivered.

Withdrawing the tools involves the production, the storage and the finance/purchase department. The production withdraws the tools from the storage based on a periodic budget frame given by the finance department. Upon withdrawal, the only data which is recorder is the name of the production department and the budget frame. These is no record to which line, machine, product or operation the tool is withdrawn. The lack of such important data cause a difficulty to manage the engineering, financial, logistics and operational aspects of the consumable tools consumption which results in inaccurate production cost calculation and tool usage which is not optimal.

Once the tool is withdrawn from the storage, it is in a stand by position, before being mounted on the machine in the production. At this stage there are neither records nor tracing possibilities of the tools. This cause dripping of tools which are never used, inaccurate stock level reports and fertile ground for breach of trust.

Using the tool on the machine involves the production and in some cases the engineering and the quality assurance (QA). Once a tool is mounted on the machine and is working, every once in a while a produced product is taken for quality checks, making sure the process is performing. In case the quality check fails, the production tries to locate the source of the problem and solve it. In cases where the production can not solve the problem the engineering and/or the QA becomes involved. The lack of early problem detection system cause higher scrap percentage as it takes time to notice the problem. The production machine counts the number of parts that are produced; however, this data is not related to an individual tool and is not recorded in a data base.

In some cases when the process is changed and some of the tools do not reach the life end, they are mounted off the machine but not being recorded or necessarily reused on a later stage. In most of the cases, once the machine counts a predefined number of produced parts, it alerts the production to change the tool. It may be that at this stage the tool has not reached its effective life end or it already exceeded its effective end. Once the tools are mounted off the machine they are being collected into two groups, one comprising the tools, which go for rework and then come back for re-use and the second the for which are scrapped and are sold for recycle. At this stage there is no recording of the collected tools. The production hands over the collected used tools to the storage for further handling. The scrapped tools are being sold to recycling companies while the tools for rework are being sent to out side contractors who rework the tools and deliver it back in the same way a normal ordering procedure is being affected. Once a tool is back from rework there is no reliable data which records the history, of each individual tool in order to draw conclusions on the cost effectiveness of the re-work procedure.

The object of the invention is a system and a process collecting, storing and monitoring consumable consumption and performance data building a reliable, real-time database which allows accurate production cost calculation, accurate stock calculation, discipline enforcement, engineering focus for process improvement and scrap reduction.

A system to monitor the consumption and performance of a consumable tool at any stage of its life cycle, according to the invention comprises a) first storage means data concerning the consumable tool; b) means to capture the performance data on the machine; c) second storage means to store performance data during operation of the tool when the tool is mounted on a machine; d) means to transfer in real-time the performance data to the aid second storage means; e) process means to assess the performance of the tool and on the basis of the said assessment to instruct or not the withdrawal of the tool; output means to deliver the said instruction to a user of the system.

A process to monitor the consumption and performance of a consumable tool at any stage of its life cycle, according to the invention, comprises the following steps: a) capture performance data during operation of the tool when the tool is mounted on a machine, b) transfer in real-time the performance data to the storage means; c) assess the performance of the tool; d) on the basis of said assessment instruct or not the withdrawal of the tool; e) deliver the instruction to withdraw the tool to the user via output means f) calculate accurate stock levels, ordering quantities and monitor tool deliveries.

The system may include further storage means to store consumable tools. Preferably the performance data of the system includes data concerning the number of items per time unit that are machined by the consumable tool and the system further comprises means to transfer in real-time the number of items per unit time to the storage means.

In a further preferred embodiment the system includes means to monitor the time units that the consumable tool is machining and means to assess on the basis of the said time units whether the tool needs to be withdrawn or not. The method according to the invention may also include a step to calculate, accurate stock levels, ordering quantities and monitor tool deliveries. For such calculation the system may comprise appropriate process means.

A preferred embodiment of the invention will be described in detail below.

A preferred embodiment of a system according to the inventions consists of four modules. The function of each module and its description is presented in the Table that follows:

| Modules | | Function | | Description |
|---|---|---|---|---|
| Module 1 | a) | Capture performance data | ✓ | Unit installed on the Production machine |
| Module 2 | b) | Real time performance data transfer | ✓ | Unit installed between the Production machine to the Main system server |
| Module 3 | c) | Tool performance assessment | ✓ | Input unit |
| | d) | Instruct withdraw to storage | ✓ | Output unit |
| | e) | Business intelligence generator | ✓ | Database |
| | f) | Deliver withdraw instruction to user | ✓ | Database processing unit |
| | g) | Calculate stock levels, ordering quantities and monitor tool deliveries | ✓ | Visualization software |
| | | | ✓ | Calculation software |
| Module 4 | h) | Storage and management for consumable tools | ✓ | Storage Unit |
| | | | ✓ | Control and command elements |
| | | | ✓ | Input Unit |
| | | | ✓ | Output Unit |
| | | | ✓ | Database |
| | | | ✓ | Data processing unit |
| | | | ✓ | Visualization software |
| | | | ✓ | Identification unit |

A system according to the invention has a reliable, real time database which contains all necessary data related to consumable items and enables the optimization of the consumable tool usage. This database is utilized by all parties involved in the production processes namely the purchase department, the finance department, the storage, the production, the engineering and the QA in order to achieve optimized processes each in his area of responsibility. To achieve an optimized process, it is essential that the data will be reliable and updated in real time. In order to ensure that all data is reliable and updated in real time the required data is communicated automatically from the production machine into the data management system, which uses the data to initiate actions, when required, and record it into the database with minimum human intervention.

The system consists of three main components, point of use, computer controlled, secured, electrical cabinet, data management system and production line data transfer system.

Once the system identifies a defined reduction in the performance level and/or a machine control parameter is equal to a defined percentage of the system average operation tool life, an alert is sent, by SMS or other similar means, to defined addresses and permission to withdraw the tool is granted. A manual option to grant permission, based on the reason for the exception, is also available. When the permitted person comes physically to withdraw the tool, after an identification process, the system will upload the tool list which the specific person was permitted to withdraw. A manual menu with search options, based on the person's authorization level, is also available. Once selecting the required tool, the storage cabinet will open automatically to allow a physical withdraw of the specific tool. The tool number, date, time, name of person and target machine number and target operation number will be written to the tool management system. As long as the system does not detect a new tool performance and/or the defined reduction in the performance level remains and/or the machine control parameter was not calibrated, the system will assume that the tool withdrawn was not mounted on the machine and alert will be sent by SMS or other similar means, to defined addresses asking for the reason.

Based on the reason the system will decide whether to continue sending the alerts or ask to return the tool withdrawn back to the storage cabinet.

Once the system will detect a new tool on the machine it will mark the tool as In-Production tool. While the tool is on the machine, online monitoring of the tool life and cycle time is available through an interface between the tool management system and the machine control system.

Once taking the used tool off the machine, the number of parts produced by the tool, the machine number, the operation number and the time and date will be written to the tool management system and the tool will be marked as returned tool. In case the actual operation tool life was in the range of a fixed percentage to the average operation tool life the system will mark the tool as fully used. In case the actual operation tool life is lower or higher than the average operation tool life, a massage will be sent to the person who took the tool off the machine asking for the reason. Based on the reason the system will decide whether to add it to the average operation tool life or not. Tools which are fully used and should not be reworked will be marked as waste. Tools which are fully used and should be reworked will be marked as pre-rework, Tools which can be further used will be marked as used with the number of parts it already produce, Tools which are disqualified due to quality reasons will be marked as complaint. Once the system marked the tool as returned tool, an alert is sent, by SMS or other similar means followed by reminders, to defined addresses, asking to put the tool back in the storage cabinet. A manual option not putting back the tool into the storage, based on the reason for the exception, is also available. When the operator comes physically to return the tool to the storage cabinet, after an identification process, the system will upload the tool list which the specific person has to put back. A manual menu with search options, based on the person's authorization level, is also available. Once the tool number will be written manually or automatically via RPM, barcode or other similar technologies, the storage cabinet will open automatically at the designated place and the date, time, name of operator and in case of complaint tool the reason for disqualification will be written to the tool management system.

Once reaching a pre-defined weight or number of units or any other accumulated measuring means of the waste, pre-rework, complaint and storage cabinet standing stock tools, a message followed by reminders will be automatically sent to the relevant addresses, including the external suppliers, and permission to collect the tools will be granted. A manual call and permission, based on the reason for the exception, is also available. Once the supplier comes for collection, after an identification process, the system will upload the tool list which the specific person was permitted to collect. A manual menu with search options, based on the person's authorization level, is also available. Once selecting the required tools, the storage cabinet will open automatically to allow a physical collection of the specific tools. The date, time, name of person and name of supplier will be written to the tool management system. A delivery note will be issued automatically and a message to the security gate will be automatically sent with the relevant information for inspection. An interface to the IT system will be available to issue formal delivery notes, invoices or any other relevant documents.

After collecting the tools the supplier will be asked to update the system with the lead time to return the re-worked tools. As long as the system is not updated by the supplier, a message, followed by reminders, will be sent to the relevant addresses, including the external supplier, asking to update the actual lead time. In any case of an exception from the average lead time the reason will be asked. A manual intervention to call for a supplier or for the supplier to update his lead time, based on the reason for the exception, is also available. When coming to supply the reworked tools, after an identification process, the system will upload the relevant tool list, based on the person's authorization level. A manual menu with search option is also available. After selecting the tools which have been returned the cabinet storage will open the relevant place. When placing the tool in its place the tool number, date, time, name of person, name of supplier and actual lead time will be written to the tool management system. In case of an exception from the average lead time the reason will be asked and based on it the system will decide whether to update the supplier's average lead time.

The system will scan the tool list on a fixed interval (for example daily) or on the occasion of production program change and will check how many tools are supposed to be used within the period of X times the average refill interval and will mark the tools which are no longer required as storage cabinet standing stock. In case the tool should be used, the system will calculate the required refill quantity based on the following formula:

$$\text{refill\_qty} = \sum_{\#op} \frac{\text{production\_program}}{\text{average\_operation\_tool\_life}} - \text{existing\_storage\_cabinet\_stock\_level}$$

The system will send, on a fixed interval basis, massage to the relevant addresses, including the external supply integrator, with the list of tools required to achieve the storage cabinet stock level and, with the list of the storage cabinet standing stock tools which are no longer required due to a production program change. Once reaching a defined, refill quantity, the system will send an alert, followed by reminders, asking the integrator to come for supply within a maximum period of time. The maximum supply period will get shorter as the refill quantity grows bigger. The integrator will be asked to confirm the required delivery date or to update it. A manual intervention to the list and/or to the call for the integrator, based on the reason for the exception, is also available. When coming physically to supply the tools, after an identification process, the system will upload the relevant tool list which should be refilled. A manual menu with search option is also available based on the person's authorization level. After selecting the tools, the cabinet storage will open the relevant place. When placing the tool in its place the tool number, date, time, name of person and supplier will be written to the tool management system and the actual refill interval will be updated. In case of an exception from the average, refill interval, the reason will be asked and based on it the system will decide whether to update the supplier's refill interval.

On each change in the production program the system will issue an order accordingly and update the average production program change interval. In case there is no change to the production program the ordering interval will be constant or equal to the average production program change interval. The system will scan the tool list and cheek whether a tool is supposed to be used, according to the production program, within the period of X times the tool average lead time. In case the tool should be used, the system will calculate the required ordering quantity based on the following formula:

$$ordering\_qty = \sum_{\#op} \frac{production\text{-}program}{average\_operation\_tool\_life} -$$

$$(integrator + in\_production + in\_transit) stock\_level$$

The system will scan the stock list including in_production and in_transit stock, will mark the tools which are not required any more as integrator standing stock and will take the following measures:
1. The supplier will be asked to cancel the order of pre-production standing stock tools which are tools that did not start production yet.
2. Standard tools which are not scheduled in the production program will be marked as standard standing stock. In case the tool will stand longer than the maximum standing stock period the supplier will be asked to take it back against a credit.
3. Special tools which are not scheduled in the production program will be marked as special tools standing stock. In case the tool will stand longer than the maximum standing stock period it will be sent to re-work to a standard tool. In case this option is not possible it will be marked and sold as waste.

The system business intelligence output consists of financial production cost calculations such as:

Actual consumables Cost Per Part (CPP): The system will calculate the actual consumables CPP based on the formula:

$$\sum_{per\_part}^{tool\_set} \frac{tool\text{-}selling\text{-}price}{actual\_tool\_life}$$

In case the actual consumables CPP will be higher or lower than a certain percentage of the average consumables CPP, a massage, followed by reminders, will be sent to the relevant addresses asking for the reason. Based on the reason the system will decide whether to update the average consumables CPP.

Gross profit CPP: The system will calculate the gross profit CPP based on the formula:

$$\sum_{per\_part}^{tool\_set} \frac{tool\text{-}production\text{-}cost}{actual\_tool\_life}$$

In case the actual gross profit CPP will be higher or lower than a certain percentage of the average gross profit CPP, a massage, followed by reminders, will be sent to the relevant addresses asking for the reason. Based on the reason the system will decide whether to update the average gross profit CPP.

Cycle time CPP: Through the system interface to the machine control, it will record each cycle time per date, time, machine number and part number. The system will calculate the actual cycle time per part based on the formula:

$$\frac{hourly\text{-}fixed\ cost}{(60/actual\_cycle\_time) \times (efficiency\_factor)}$$

In case the actual cycle time per part will be higher or lower than a certain percentage of the average cycle time, a massage, followed by reminders, will be sent to the relevant addresses asking for the reason. Based on the reason the system will decide whether to update the average cycle time per part.

Total CPP: The system will calculate the total CPP based on the formula:

$$consumables\_CPP + cycle\_time\_CPP$$

in case the actual total CPP will be higher or lower than a certain percentage of the average total CPP, the system will look for the reason in the actual cycle time CPP or the actual consumables CPP. Based on the reason the system will decide whether to update the average total CPP.

Consumables CPP saving: The system will calculate the consumables CPP saving based on the formula:

$$\left[100 \times \frac{(1 - actual\text{-}consumables\_CPP)}{initial\_consumables\_CPP}\right]\%$$

The initial consumables CPP will be based on the production line performance prior to the system installation. In case the actual consumables CPP saving will be higher or lower than a certain percentage of the average consumables CPP saving, the system will look for the reason in the actual consumables CPP. Based on the reason the system will decide whether to update the average consumables CPP saving.

Cycle time CPP saving: The system will calculate the cycle time CPP saving based on the formula:

$$\left[100 \times \frac{(1 - annual\text{-}cycle\text{-}time - CPP)}{initial\_cycle\_time\_CPP}\right]\%$$

The initial cycle time CPP will be based on the production line performance prior to the tool life monitoring system installation. In case the actual cycle time CPP saving will be higher or lower than a certain percentage of the average cycle time CPP saving, the system will look for the reason in the actual cycle time CPP. Based on the reason the system will decide whether to update the average cycle time CPP saving.

Total CPP saving: The system will calculate the total CPP saving based on the formula:

$$\left[100 \times \frac{(1 - annual - CPP)}{Initial\_CPP}\right]\%$$

In case the actual CPP saving will be higher or lower than a certain percentage of the average CPP saving, the system will look for the reason in the actual total CPP. Based on the reason the system will decide whether to update the average CPP saving.

An example of the life cycle of a consumable tool and an example of data stored in the system are presented below:

Consumable Tool Life Cycle Table

| Cycle | Execution |
|---|---|
| 1 Withdrawal | Identify tool end, send alert, authorize and execute withdrawal, register, routing reminder |

| Cycle | | Execution |
|---|---|---|
| 2 | In-Production | Tool identification, register, monitor tool life and cycle time |
| 3 | Return | Identify tool life start, register tool life, mark tools, alert, tool identification, execute, register |
| 4 | Collection | Call, authorize and execute, register, delivery note, notify gate, interface IT |
| 5 | Return renewed | Lead time follow-up, goods receipt, register |
| 6 | Refill | Refill qty, standing stock, report, call supplier, delivery follow-up, goods receipt, register |
| 7 | Order | Order interval, order qty, standing stock handling |

Consumable Tool Life Cycle Table

1. Withdrawal
    Identify end of the tool life.
    Send alert for withdraw.
    Grant permission for tool withdraws.
    Physical withdraw by personal identification.
    Register date, time, name of person.
    Until the new tool start to work on the machine, send alerts.
2. In-Production
    Tool identification and register machine number, operation number, date, time and operator name.
    Correlate manually or automatically the new tool to the last tool withdrawn and its target machine and target operation.
    Detect new tool performance.
    Tool life monitoring.
    Cycle time monitoring.
3. Return
    Detect new tool performance.
    Register number of parts produced, machine number, operation number, date and time.
    Update the average operation tool life and register exceptions.
    Mark the tool as waste, pre-renewal, complaint or used.
    Send alert to return the tool to the cabinet.
    Physical return to a designated place by personal identification and tool identification.
    Register date, time, operator name and in case of complaint, the reason.
4. Collection
    Call for collection of waste, pre-rework, complaint and cabinet standing stock tools when reaching a fixed level.
    Grant permission for collection.
    Physical collection by personal identification.
    Register date, time, name of person and name of supplier.
    Issue delivery note.
    Send massage to the gate.
    Interface to the IT system to issue formal documents.
5. Return reworked tools
    Alert the supplier to update lead time.
    Alert in case of exceptions between confirmed and average lead time.
    Physical return to a designated place by personal identification.
    Register tool number, date, time, name of person, name of supplier, number of re-works and actual lead time.
    Update the average supplier lead time and register exceptions.
6. Refill
    Cabinet stock scan on fixed interval or on production program change.
    Calculate required refill qty to meet the production program demand on a period of X times the average refill interval.
    Mark tools which are not required to the production program as cabinet standing stock.
    Send standing stock and refill qty report on fixed intervals.
    Call for refill within max. period, when reaching a defined refill qty.
    Send reminders until integrator confirm or update delivery date.
    Physical refill by personal identification to a designated place.
    Register tool number, date, time, name of person, name of supplier, actual refill interval.
    Update the average refill interval and register exceptions.
7. Order
    Tool list scan on fixed interval or on production program change
    Update the average production program change interval
    Calculate required ordering qty per tool to meet the production program demand on a period of X times the tool average lead time
    Mark tools which are not required to the production program as integrator standard standing stock and specials standing stock
    Alert to cancel orders of pre-production standing stock.
    After tool is standing longer then the maximum standing stock period, alert to return standard tools to the supplier and special tools for re-work or for waste

The invention claimed is:

1. A system for monitoring consumption of at least one consumable tool mounted to a production machine, the system comprising:
   a performance data capture unit installed on the production machine and configured to capture performance data for the at least one consumable tool, wherein the at least one consumable tool comprises a tool or material that is consumed by a production process, and wherein the performance data comprises at least one of the following: a number of items that are machined by the at least one consumable tool, a time that the at least one consumable tool is used, a time that the at least one consumable tool is used for machining an item, or any combination thereof;
   at least one data processing unit configured to: determine if the at least one consumable tool needs to be replaced based at least partially on the performance data, generate at least one instruction in response to determining that the at least one consumable tool needs to be replaced, detect when the at least one consumable tool is removed from the production machine, receive user input after the at least one consumable tool is removed from the production machine, and determine a status for the at least one consumable tool based at least partially on the user input, the status including at least one of the following: waste, pre-rework, capable of further use, disqualified, or any combination thereof; and
   at least one storage cabinet configured to store consumable tools, receive the at least one instruction, and automatically open to allow access to the consumable tools based at least partially on the at least one instruction after user input is received, the user input comprising at least one of the following: a user identification, a tool number, a tool selection, a reason for removal, or any combination thereof.

2. The system of claim 1, further comprising at least one performance data transfer unit configured to transfer the performance data to at least one storage device.

3. The system of claim 1, wherein the at least one data processing unit is further configured to: calculate stock levels, calculate ordering quantities, monitor tool deliveries, or any combination thereof.

4. The system of claim 1, wherein the at least one data processing unit is further configured to generate the at least one instruction to withdraw the at least one consumable tool from the at least one storage cabinet based at least partially on the performance data, and wherein the system further comprises an output unit configured to deliver the at least one instruction to at least one user and the at least one storage cabinet.

5. The system of claim 1, further comprising a display device configured to display a menu of consumable tools, wherein the menu is configured to allow a user selection.

6. The system of claim 1, wherein at least one of the at least one data processing unit and the at least one storage cabinet is configured to generate at least one alert if a new consumable tool has been withdrawn from the at least one storage cabinet for a predetermined period of time and is not detected on the production machine.

7. The system of claim 1, wherein the at least one storage cabinet is configured to be accessed by a user to refill the storage cabinet after user input and, based at least partially on the user input, determine a refill interval.

8. The system of claim 1, wherein the at least one data processing unit is further configured to detect when the at least one consumable tool is removed from the production machine, receive user input after the at least one consumable tool is removed from the production machine and, based at least partially on the user input, determine whether to identify the at least one consumable tool in a database as at least one of the following: waste, pre-rework, capable of further use, disqualified due to quality, or any combination thereof.

9. The system of claim 1, wherein the at least one data processing unit is further configured to receive user input after the at least one consumable tool is removed from the production machine, and automatically open the storage cabinet after the user input is received, the user input comprising at least one of the following: a user identification, a tool number, a tool selection, a reason for removal, or any combination thereof.

10. The system of claim 1, wherein the at least one data processing unit is further configured to transmit, to at least one user, an alert requesting to place the at least one consumable tool in the at least one storage cabinet after the at least one consumable tool has been removed.

11. The system of claim 1, wherein the performance data capture unit is installed on the production machine.

12. A method for monitoring consumption of at least one consumable tool mounted to a machine, the method comprising:
   collecting performance data during operation of the at least one consumable tool with a performance data capture unit installed on the machine;
   determining, with at least one processor, if the at least one consumable tool has been at least partially consumed based at least partially on the performance data;
   generating at least one instruction based at least partially on the performance data;
   transmitting at least a portion of the at least one instruction to at least one user and a secure storage cabinet;
   allowing access to the secure storage cabinet based at least partially on the at least a portion of the at least one instruction;
   detecting when the at least one consumable tool is removed from the machine;
   receiving user input after the at least one consumable tool is removed from the machine; and
   determining a status for the at least one consumable tool based at least partially on the user input, the status including at least one of the following: waste, pre-rework, capable of further use, disqualified, or any combination thereof.

13. The method of claim 12, further comprising determining, with at least one processor, at least one of the following: a stock level, an ordering quantity, or any combination thereof.

14. The method of claim 12, further comprising monitoring tool deliveries to the secure storage cabinet.

15. The method of claim 12, further comprising displaying, on at least one display device, a menu configured to allow at least one user to select a consumable tool.

16. The method of claim 12, wherein the performance data comprises at least one of the following: data representing a number of items that are machined by the at least one consumable tool, data representing a number of items per unit of time that are machined by the at least one consumable tool, an amount of time that the at least one consumable tool is used, or any combination thereof.

17. The method of claim 12, further comprising generating at least one alert if a new consumable tool has been withdrawn from the secure storage cabinet for a predetermined period of time and is not detected on the machine.

18. The method of claim 12, further comprising storing, in at least one storage device after the at least one consumable tool is removed from the machine or the at least one instruction is generated, at least one of the following: a number of parts produced by the at least one consumable tool, a machine number associated with the machine, an operation number of the at least one consumable tool, a date and time, or any combination thereof.

19. The method of claim 12, further comprising:
automatically opening the storage cabinet after the user input is received, the user input comprising at least one of the following: a user identification, a tool number, a tool selection, a reason for removal, or any combination thereof.

20. The method of claim 12, further comprising determining a refill interval based at least partially on user input.

21. A system for monitoring consumption of at least one consumable tool mounted to a production machine, the system comprising:
at least one secure storage cabinet configured to store consumable tools and to facilitate access to the consumable tools based at least partially on at least one instruction;
at least one data processing unit in communication with the production machine and the at least one secure storage cabinet, the at least one data processing unit configured to:
receive performance data for the at least one consumable tool from a performance data capture unit installed on the production machine;
determine, based at least partially on the performance data, if the at least one consumable tool should be replaced;
generate the at least one instruction based at least partially on the determination;
transmit the at least one instruction to the secure storage cabinet;
detect when the at least one consumable tool is removed from the production machine;
receive user input after the at least one consumable tool is removed from the production machine; and
automatically open the at least one secure storage cabinet after the user input is received, the user input comprising at least one of the following: a user identification, a tool number, a tool selection, a reason for removal, or any combination thereof.

\* \* \* \* \*